Aug. 16, 1932.  V. L. DU BOIS  1,871,965

GATE VALVE

Filed March 27, 1929

INVENTOR
Virgil L. DuBois.
BY
Arthur C. Brown
ATTORNEY

Patented Aug. 16, 1932

1,871,965

UNITED STATES PATENT OFFICE

VIRGIL L. DU BOIS, OF TULSA, OKLAHOMA, ASSIGNOR TO THE STOUGH TANK ERECTING COMPANY, OF TULSA, OKLAHOMA, A CORPORATION OF OKLAHOMA

GATE VALVE

Application filed March 27, 1929. Serial No. 350,274.

My invention relates to gate valves and more particularly to a device of that character for controlling fluid passing through a flow line, and including slide valve cut-off mechanism of novel construction; the principal object of the invention being to prevent accumulation of sand, sediment or other foreign substance in the valve, thereby permitting the valve to be readily opened or closed after indefinite periods of use in either open or closed position.

In accomplishing these and other objects of the invention, I have provided improved details of structure, the preferred forms of which are illustrated in the accompanying drawing, wherein.

Figure 1:
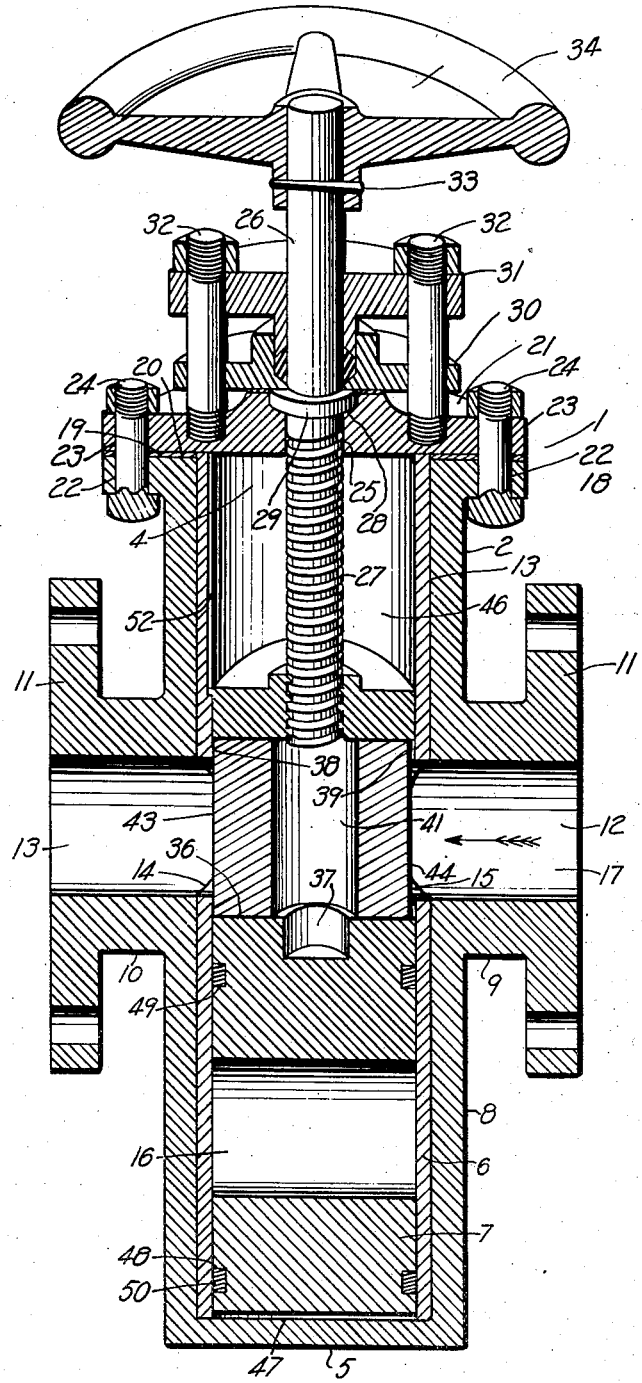
Fig. 1 is a central longitudinal section of a valve including my improvements and showing the valve closed.
Figure 2:
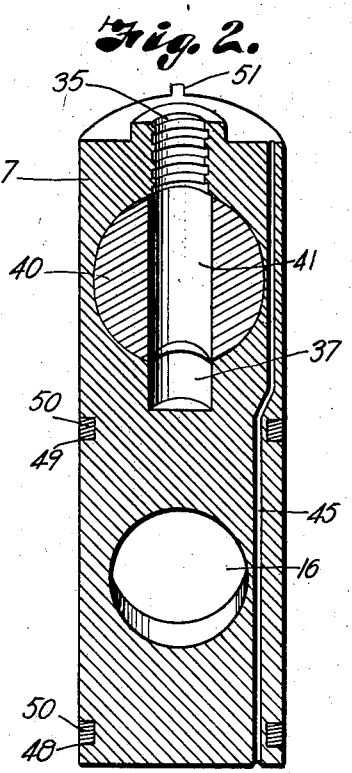
Fig. 2 is a central longitudinal section of the slide valve piston.
Figure 3:
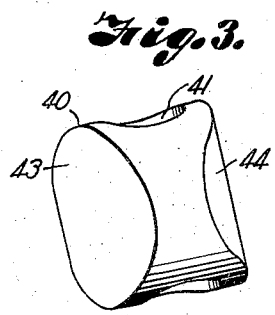
Fig. 3 is a detail perspective view of the valve seat plug.

Referring in detail to the drawing:

1 designates the valve housing including a cylindrical body 2 having a central bore 3 extending from an open upper end 4 to the closed bottom end 5 and lined with a bushing 6 for receiving a piston 7 for slidable movement therein.

Extending sidewardly and outwardly from opposite sides of the body walls 8 and substantially mid-way thereof are neck portions 9 and 10 provided with apertured end flanges 11 for attachment to adjoining sections of a flow line.

The neck portions are provided with horizontally aligning openings 12 and 13 registering with openings 14 and 15 in the side walls of the bushing 6 and adapted for registering with a transverse opening 16 in the lower portion of the piston 7, to form a through channel 17 in the body when the piston is in open position.

Provided at the upper end of the body 2 is an outwardly extending annular flange 18 having a flat top face 19 fitted with a gasket 20, supporting a closure plate 21, and provided in the flange are a plurality of equally spaced openings 22.

The closure plate 21 is provided with openings 23 registering with the openings 22 in the flange 18 for receiving bolts 24 whereby the members are connected, the gasket 20 serving to effect a fluid tight seal between the members.

Located centrally in the closure plate is an opening 25 receiving the stem 26 of a lead screw 27, and having a counterbore 28 at its upper end engaging a collar portion 29 on the stem.

The stem 26 extends upwardly through packing gland members 30 and 31 secured to the closure plate by bolts 32, and fixed on the upper end of the stem by a pin 33 is a hand wheel 34 whereby the screw 27 may be rotated for shifting the piston member 7 presently described.

The screw 27 extending downwardly from the stem 26 and centrally through the bushing 6 is threadedly engaged in an opening 35 in the upper end of the piston 7, and the opening extends downwardly into a transverse channel 36 in the piston and aligns with a recess 37 at the lower side of the channel for receiving the end of the screw when the piston is in open position.

The channel 36 in the piston is slightly larger in diameter than the openings 14 and 15 in the bushing 6, thus forming annular seating surfaces 38 and 39 around the respective openings.

Slidably mounted in the channel 36 of the piston is a cylindrical valve seat plug 40 having an elongated transverse opening 41 aligning with the opening 35 and recess 37 for receiving the screw 27 when the piston is shifted upwardly.

The valve seat plug 40 is provided with rounded ends 43 and 44 conforming to the inner walls of the bushing, the maximum length between the rounded ends being slightly less than the diameter of the bushing to permit a slight shifting movement of the plug and seating of the end 43 with the seating surface 38, or of the end 44 with the seating surface 39, for sealingly closing the connection between the openings 12 and 13 of the neck portions 9 and 10.

The piston 7 is provided with a longitudinally extending port 45 opening through opposite ends of the piston for connecting the upper and lower chamber portions 46 and 47 in the bushing, and thus permitting equalization of pressure on opposite sides of the piston in the event that fluid escapes between the walls of the piston and bushing to either of the chamber portions, the port 45 also serving as a channel for conveying lubricant alternately to the upper and lower chambers, thereby facilitating operation of the valve.

Formed in the walls of the piston above and below the opening 16 are annular grooves 48 and 49 fitted with packing rings 50 forming a fluid tight seal with the walls of the bushing to prevent the escape of fluid to the chamber portions 46 and 47 when the opening is in registering position with the openings 14 and 15 in the bushing 6.

Protruding sidewardly from the upper end of the piston is an ear 51 slidably engaging a longitudinal slot 52 in the bushing 6 for maintaining the piston in proper working alignment in the bushing.

In using a valve constructed as illustrated and described, opening and closing of the valve is effected by shifting the piston 7 in the bushing 6 by manipulation of the hand wheel 34.

When the piston is positioned as shown in Fig. 1, the valve plug 40 is located between the bushing openings 14 and 15 so that the rounded ends 43 and 44 may engage the seats 38 and 39 depending on the direction of pressure of the fluid in the flow line.

Assuming that the pressure of the fluid is exerted in the direction indicated by the arrow, then the rounded end 43 of the plug 40 will engage the seat 38 as shown.

When it is desired to open the valve, the hand wheel is rotated to bring the transverse opening 16 of the piston into alignment with the bushing openings 14 and 15 to form the through channel 17, so that the fluid may flow through the valve.

It will be obvious from the illustration and foregoing description, that pockets and recesses have been practically eliminated from the valve seating members, thereby preventing the accumulation of sand, sediment or other foreign substances, and permitting the valve to be readily opened or closed without interference from such causes.

What I claim and desire to secure by Letters Patent is:

1. A valve of the character described including a housing having a flow channel and a bore intersecting said channel, a piston slidable in said bore having a port adapted for providing connection between the sections of said flow channel at opposite sides of said bore and having a through opening of greater diameter than said channel spaced from said port, a unitary valve plug bodily slidable in said through opening to seat against the portions of said housing surrounding the opening under pressure of fluid in said flow channel and means for shifting the piston to selectively expose the port or valve plug to the through channel.

2. A valve of the character described, including a housing having a chamber and a channel intersecting the chamber, a piston in said chamber having spaced cylindrical openings selectively alignable with said channel, and a valve plug in one of said openings responsive to fluid pressure for sealingly closing the channel, said plug being substantially cylindrical both in horizontal and vertical cross section for sealingly engaging the wall of said cylindrical opening and for sealingly closing the channel.

In testimony whereof I affix my signature.
VIRGIL L. DU BOIS.